J. S. THURMAN.
SELF CLOSING VALVE FOR VACUUM CLEANING TOOLS.
APPLICATION FILED JULY 19, 1907.
918,930.
Patented Apr. 20, 1909.
2 SHEETS—SHEET 1.
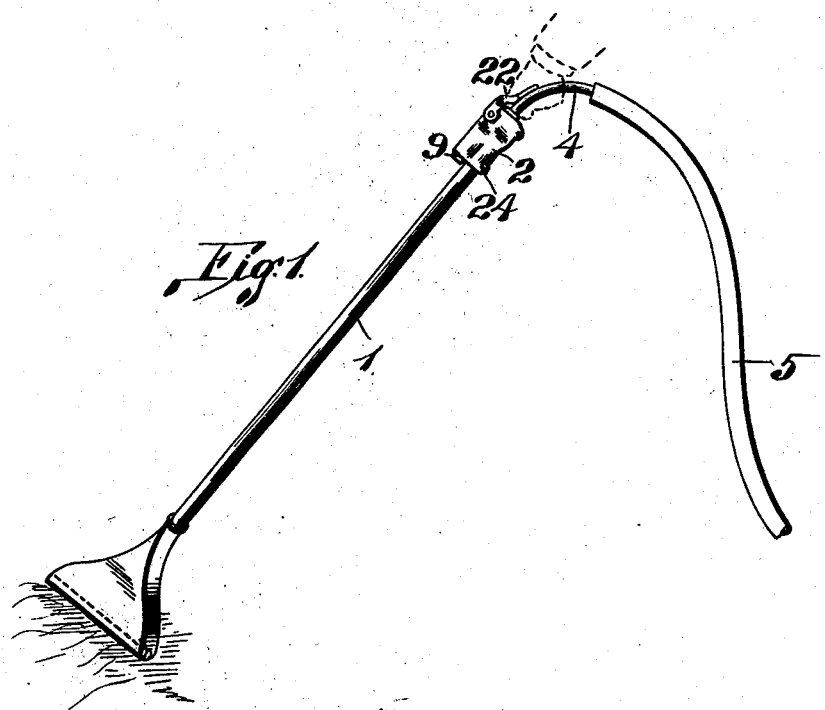
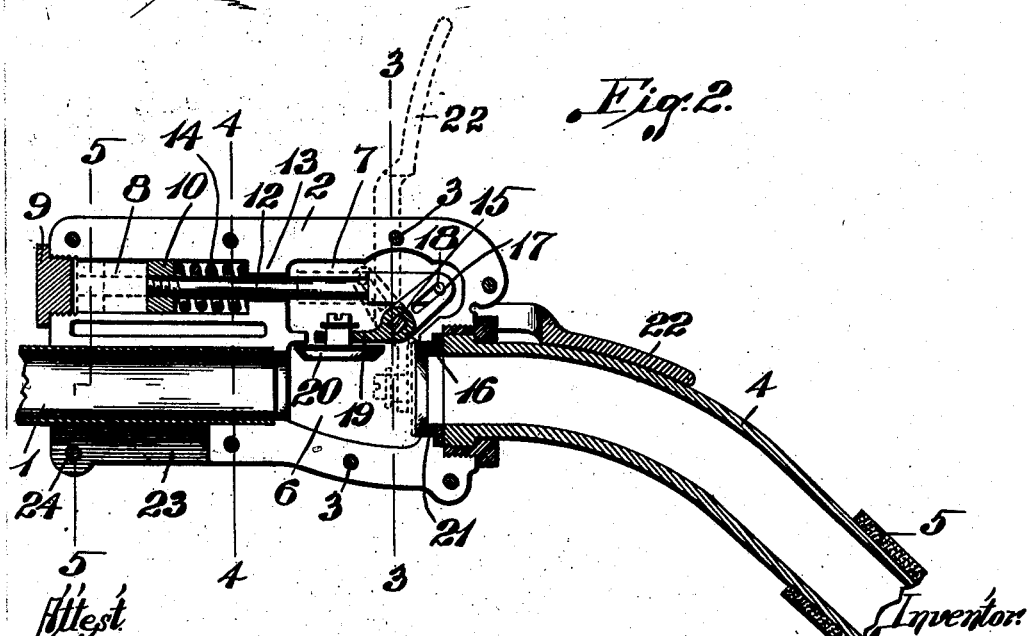

J. S. THURMAN.
SELF CLOSING VALVE FOR VACUUM CLEANING TOOLS.
APPLICATION FILED JULY 19, 1907.
918,930.
Patented Apr. 20, 1909.
2 SHEETS—SHEET 2.
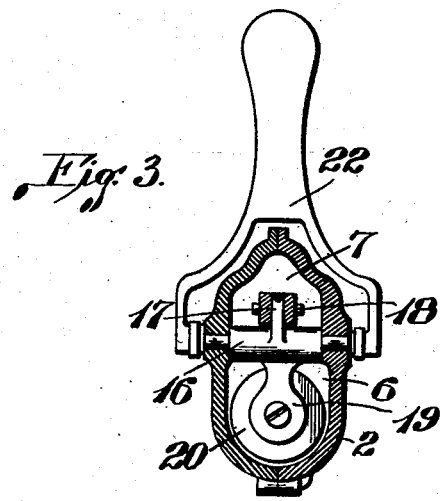
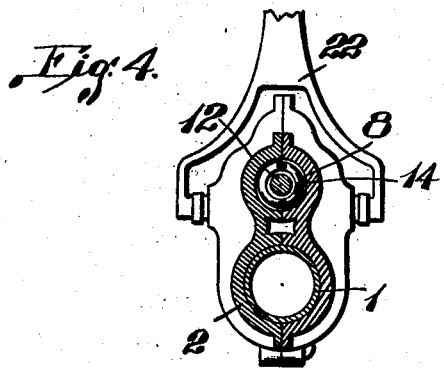
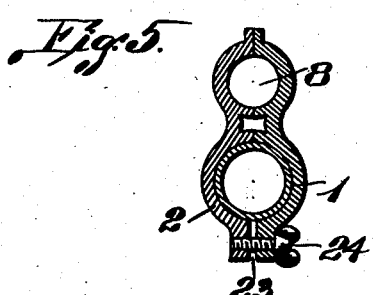
Attest.
E. M. Harrington.
M. P. Smith.
Inventor:
John S. Thurman.
By Higdon & Longan
Attys.

UNITED STATES PATENT OFFICE.

JOHN S. THURMAN, OF ST. LOUIS, MISSOURI.

SELF-CLOSING VALVE FOR VACUUM CLEANING-TOOLS.

No. 918,930.          Specification of Letters Patent.      Patented April 20, 1909.

Application filed July 19, 1907. Serial No. 384,634.

*To all whom it may concern:*

Be it known that I, JOHN S. THURMAN, a citizen of the United States, and resident of St. Louis, Missouri, have invented certain new and useful Improvements in Self-Closing Valves for Vacuum Cleaning-Tools, of which the following is a specification containing a full, clear, and exact description, reference being had to the accompanying drawings, forming a part hereof.

My invention relates to a self-closing valve for vacuum cleaning tools, the object of my invention being to provide a valve for the handles of compressed air and vacuum cleaning tools which will automatically close when the tool is laid aside after being in operation, thus instantly cutting off the passage of air through the tool, thereby preventing waste of air and power.

A further object of my invention is to provide a vacuum or compressed air cleaning tool with a self-closing valve, which, when open, allows free passage through the valve housing equal in area to the opening through any other part of the tool, thus preventing the clogging of the valve, due to the drawing in of extra large particles of foreign matter.

To the above purposes, my invention consists in certain novel features of construction and arrangement of parts, which will be hereinafter more fully set forth, pointed out in the claims, and illustrated in the accompanying drawings, in which:—

Figure 1 is a perspective view of a cleaning tool equipped with my improved valve; Fig. 2 is a vertical section taken through the valve housing and a portion of the handle of the tool; Fig. 3 is a transverse section taken on the line 3—3 of Fig. 2; Fig. 4 is a transverse section taken on the line 4—4 of Fig. 2; Fig. 5 is a transverse section taken on the line 5—5 of Fig. 2.

Referring by numerals to the accompanying drawings:—1 designates the tubular handle of a compressed air or vacuum cleaning tool, and rigidly fixed to the upper end thereof in any suitable manner is a valve housing 2, preferably made in mating halves and clamped together by screws 3; and secured to the end of the valve housing, opposite from the end which is clamped on the handle 1, is a short curved tube 4, onto the outer end of which is detachably connected the flexible vacuum tube or hose 5.

Formed in the lower portion of the housing 2, between the ends of the tubes 1 and 4, is a valve chamber 6, and immediately above this chamber and communicating therewith is a chamber 7, which is occupied by a portion of the valve operating mechanism.

Immediately opposite the chamber 7 and above the tube 1 is a cylindrical chamber 8, the outer end of which is closed by a screw plug 9; and arranged to slide in said cylindrical chamber 8 is a circular block 10, to which is fixed one end of a rod 12, which extends into the chamber 7. Arranged on said rod and interposed between the block 10 and the flange 13 formed integral with the valve housing, between the chambers 7 and 8, is an expansive coil spring 14.

Transversely arranged in the forward end of the chamber 7 is a rock shaft 15, the ends of which are journaled in the side walls of the housing 2; and mounted on this shaft, within the chamber 7, is a sleeve 16, with which is formed integral a slotted arm 17, which receives a pin 18 carried by the forward end of the rod 12.

Formed integral with the sleeve 16, opposite the arm 17, is a finger 19, carrying a disk valve 20, having a beveled edge, and which is normally seated upon a washer 21, of rubber, or analogous material, and which is arranged within the housing 2 immediately against the end of the tube 4.

Fixed on the ends of the rock shaft 15, which project through the side walls of the housing 2, is the bifurcated lower end of a handle 22, which normally occupies a vertical position at right angles to the valve housing 2, and which when swung downwardly lies flat upon the tube 4 adjacent the housing 2.

The meeting faces of the mating halves of the housing 2 are cut away at the lower forward corners, as designated by 23, and passing through these portions of the housing is a thumb screw 24, which clamps the lower forward corners of said housing together, and thus the housing is rigidly fixed on the end of the tubular handle 1.

When a tool equipped with my improved handle is in use, the hand of the operator engages the handle 22, and the same is moved downward onto the tube 4, and so held while the cleaning tool is manipulated. This action swings the valve 20 upward into a horizontal plane, thus leaving the full area of the valve opening free so that all matter drawn into the tube 1 has free passage through the valve housing and into the tubes 4 and 5.

When the handle 22 is thus held against the tube 4, the rod 12 is moved forward through the chamber 7, thus moving the block 10 forward through the chamber 8, thereby storing power in the coil spring 14; and as soon as the operator lays the tool aside or removes his hand from the handle 22, the power stored in the coil spring 14 will instantly act to close the valve 20 upon its seat 21, thus automatically cutting off the passage of air through the tool, and preventing loss of air and power which would occur through carelessness of the operator in closing a mechanically operated valve.

A valve of my improved construction is simple, inexpensive, easily applied to the tubular handles of vacuum cleaning tools, closes automatically, and requires but the ordinary pressure of the hand upon the tool to maintain the valve in an open position.

I claim:—

1. The herein described valve for vacuum cleaning tools, comprising a housing adapted to connect two tubular portions of a cleaning tool handle, a spring held valve arranged in the housing and adapted to swing away from its seat to permit the full area of opening of the tubular portions of the handle through the housing, and a handle for holding said valve open.

2. A valve for vacuum cleaning tools, comprising a housing adapted to connect two tubular portions of a cleaning tool handle, a ring forming a valve seat arranged in the housing, a valve arranged in the housing normally held against the ring, and which valve is adapted to swing away from its seat to allow the full area of opening of the tubular portions of the handle through the housing, and a handle for holding said valve open.

3. A self closing valve for vacuum cleaning tools, comprising a housing constructed in mating halves and adapted to be clamped onto the adjacent ends of two tubular portions of a cleaning tool handle, a valve seat arranged within the housing adjacent the end of one of the tubular portions of the cleaning tool handle, a spring held valve normally positioned on the seat, and a handle for swinging the valve away from its seat so as to allow the full area of opening of the tubular portions of the handle through the housing.

4. A valve for vacuum cleaning tools, comprising a sectional housing adapted to be assembled and connect the adjacent ends of two tubular portions of a cleaning tool handle, a valve operating within the housing and adapted to swing away from its seat so as to occupy a position to one side of the opening through the housing and which connects the tubular portions of the cleaning tool handle, a spring for holding the valve normally closed, and a handle for holding said valve open.

5. The herein described valve for cleaning tools, comprising a housing connecting two tubular portions of a cleaning tool handle, a valve seat arranged in the housing, a rock shaft journaled in the housing and a finger arranged on the rock shaft within the housing, a valve loosely carried by the finger and adapted to engage upon the valve seat, and a handle connected to the ends of the rock shaft for rocking the same to hold the valve open.

6. The herein described valve for cleaning tools, comprising a housing connecting two tubular portions of a cleaning tool handle, a valve seat arranged in the housing, a rock shaft journaled in the housing and a finger arranged on the rock shaft within the housing, a valve loosely carried by the finger and adapted to engage upon the valve seat, a handle connected to the ends of the rock shaft for rocking the same to hold the valve open, and spring actuated means connected to the rock shaft and adapted to normally hold the valve upon its seat.

In testimony whereof, I have signed my name to this specification, in presence of two subscribing witnesses.

JOHN S. THURMAN.

Witnesses:
M. P. SMITH,
E. L. WALLACE.